No. 879,544.

J. W. HICKS.
WRAPPING MACHINE.
APPLICATION FILED OCT. 6, 1906.

PATENTED FEB. 18, 1908.

11 SHEETS—SHEET 3.

Fig. 3

Witnesses:
Inventor:

No. 879,544. PATENTED FEB. 18, 1908.
J. W. HICKS.
WRAPPING MACHINE.
APPLICATION FILED OCT. 6, 1906.
11 SHEETS—SHEET 4.
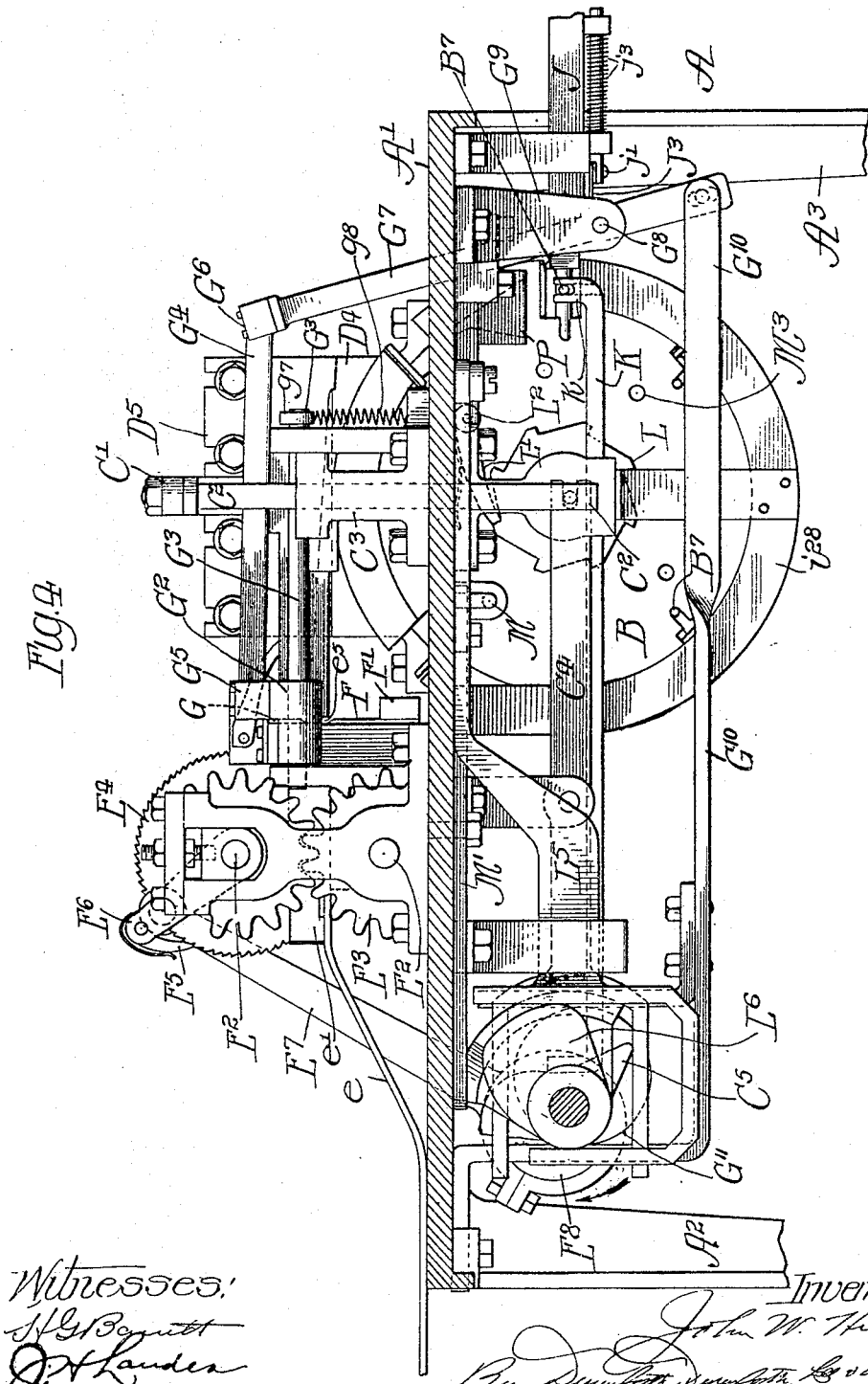

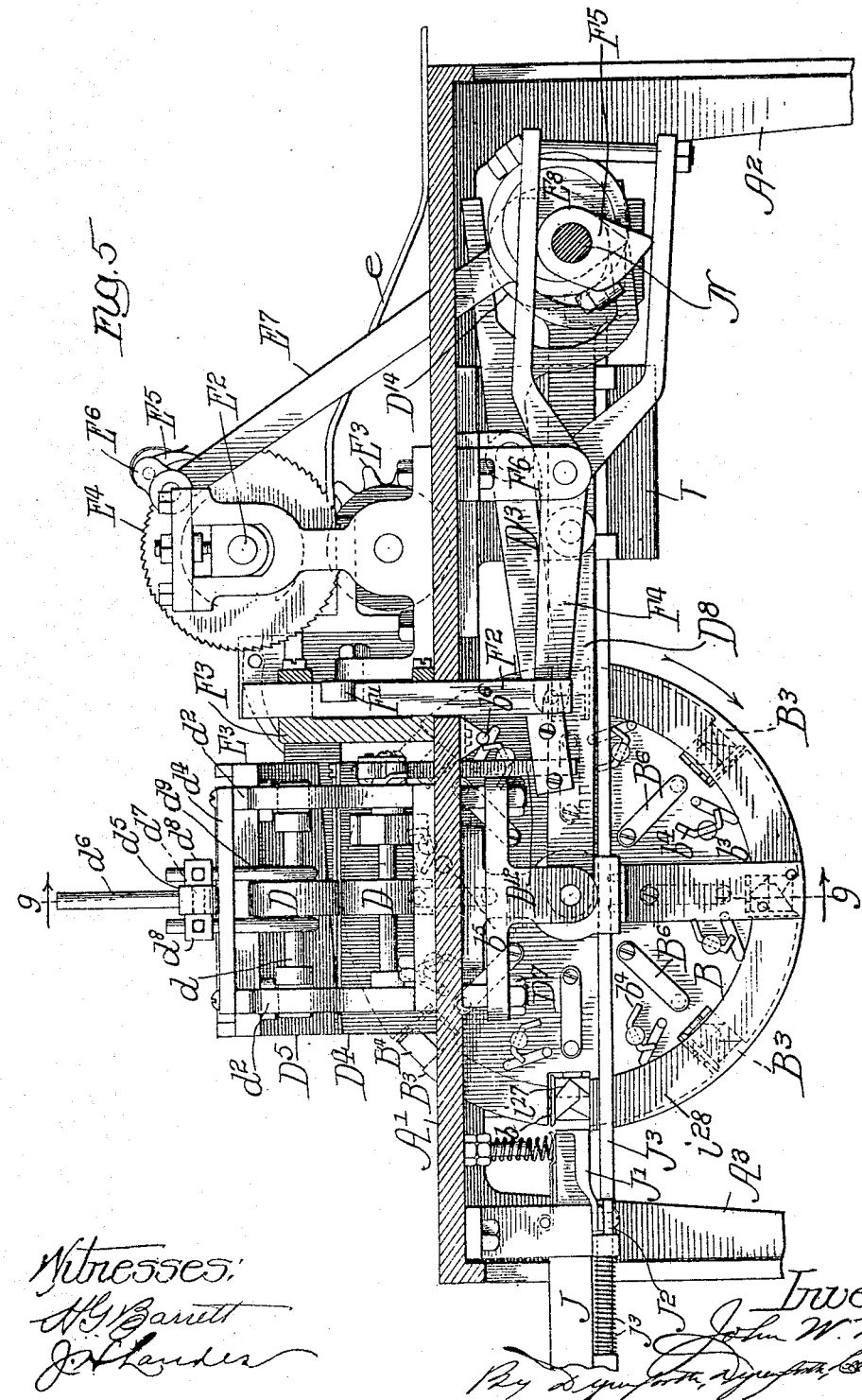

No. 879,544. PATENTED FEB. 18, 1908.
J. W. HICKS.
WRAPPING MACHINE.
APPLICATION FILED OCT. 6, 1906.
11 SHEETS—SHEET 6.
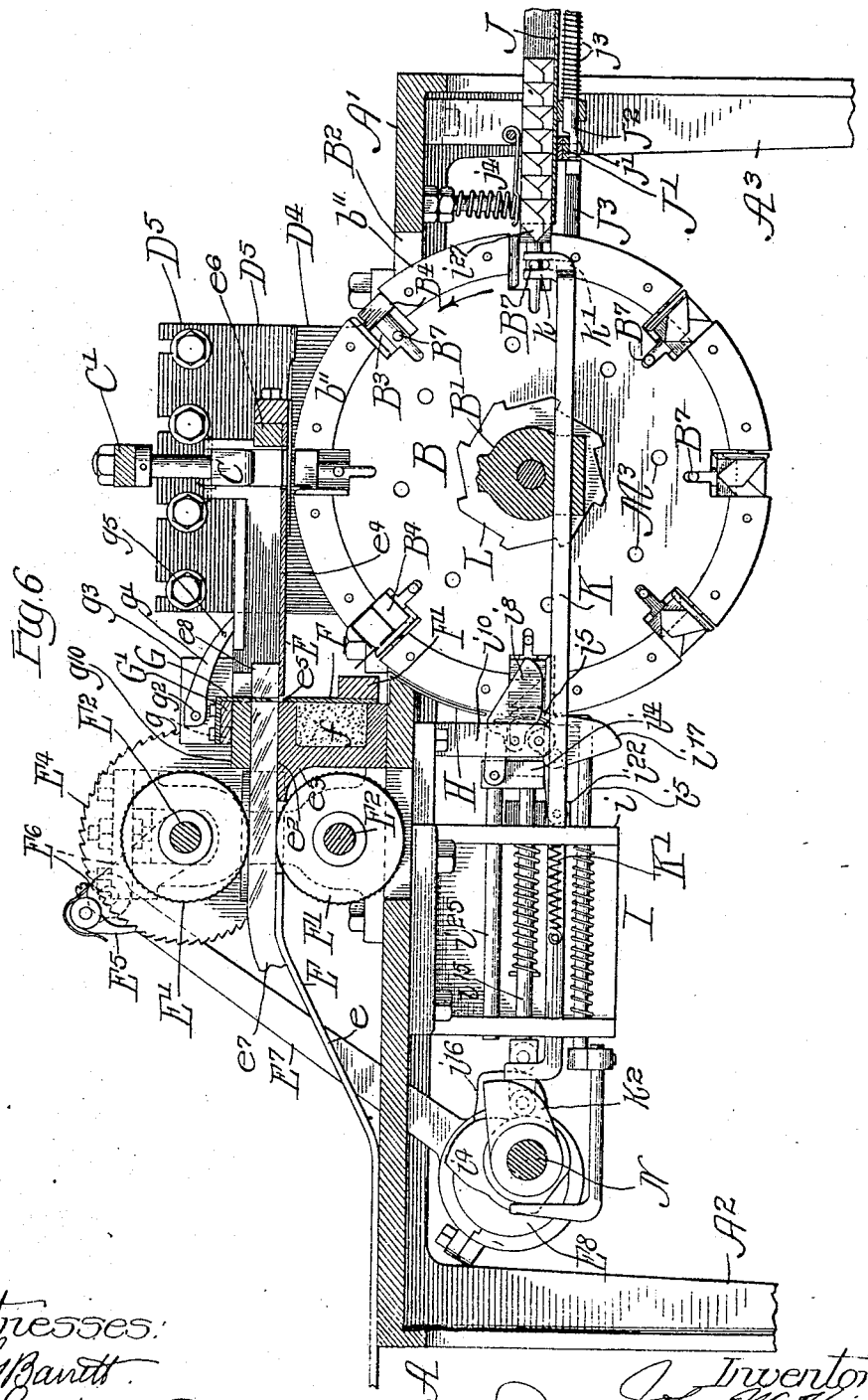

No. 879,544. PATENTED FEB. 18, 1908.
J. W. HICKS.
WRAPPING MACHINE.
APPLICATION FILED OCT. 6, 1906.
11 SHEETS—SHEET 7.
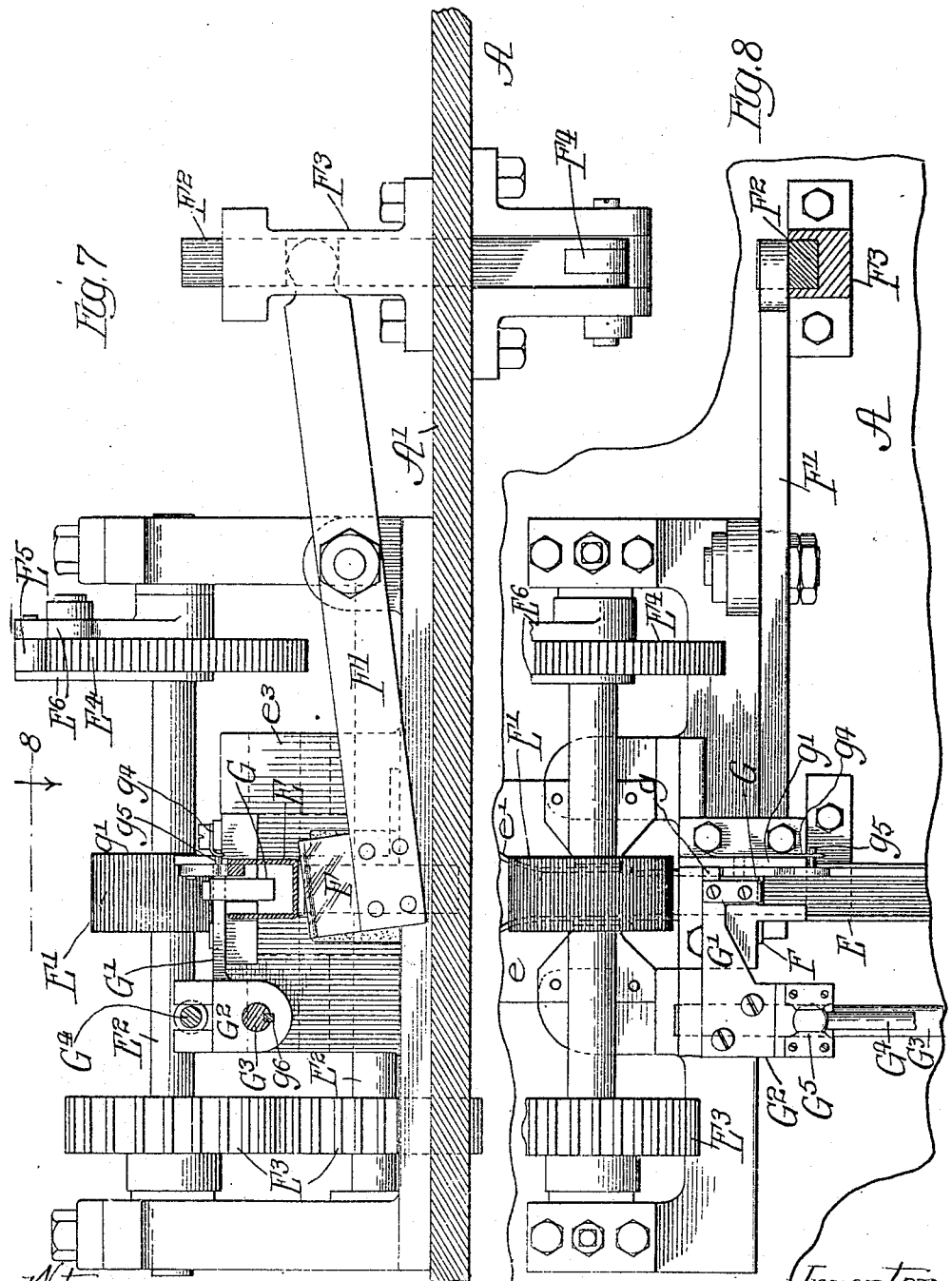

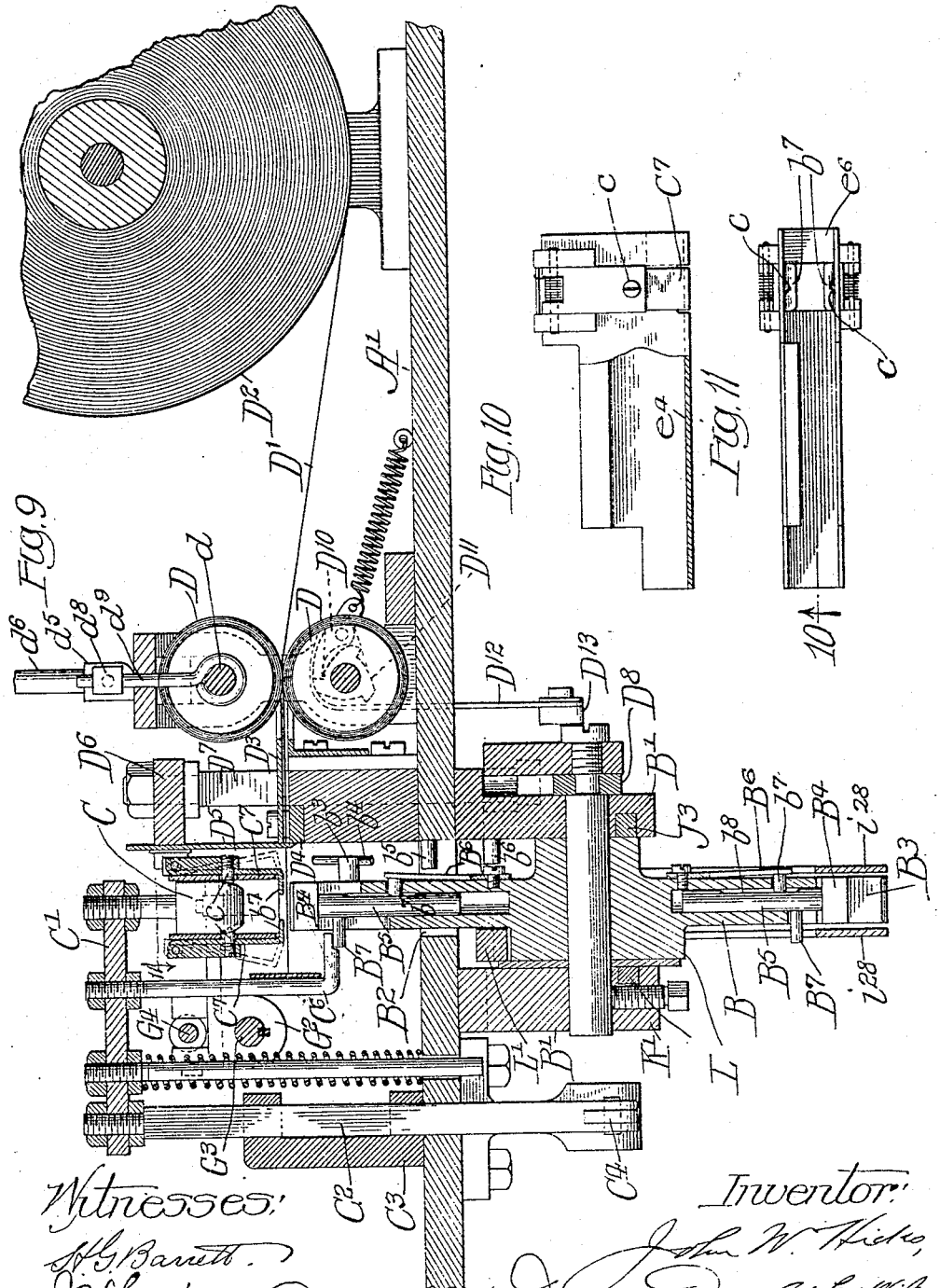

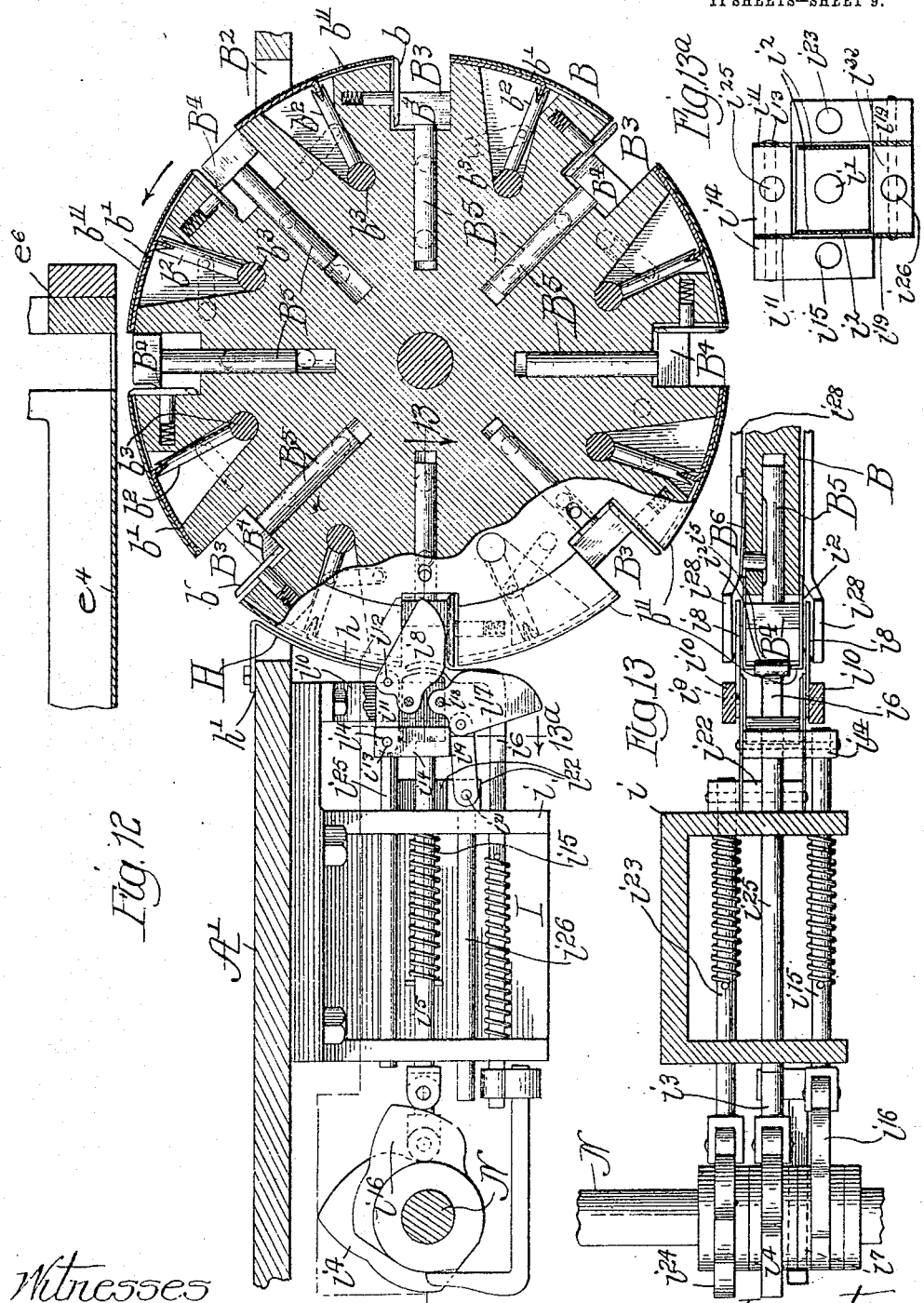

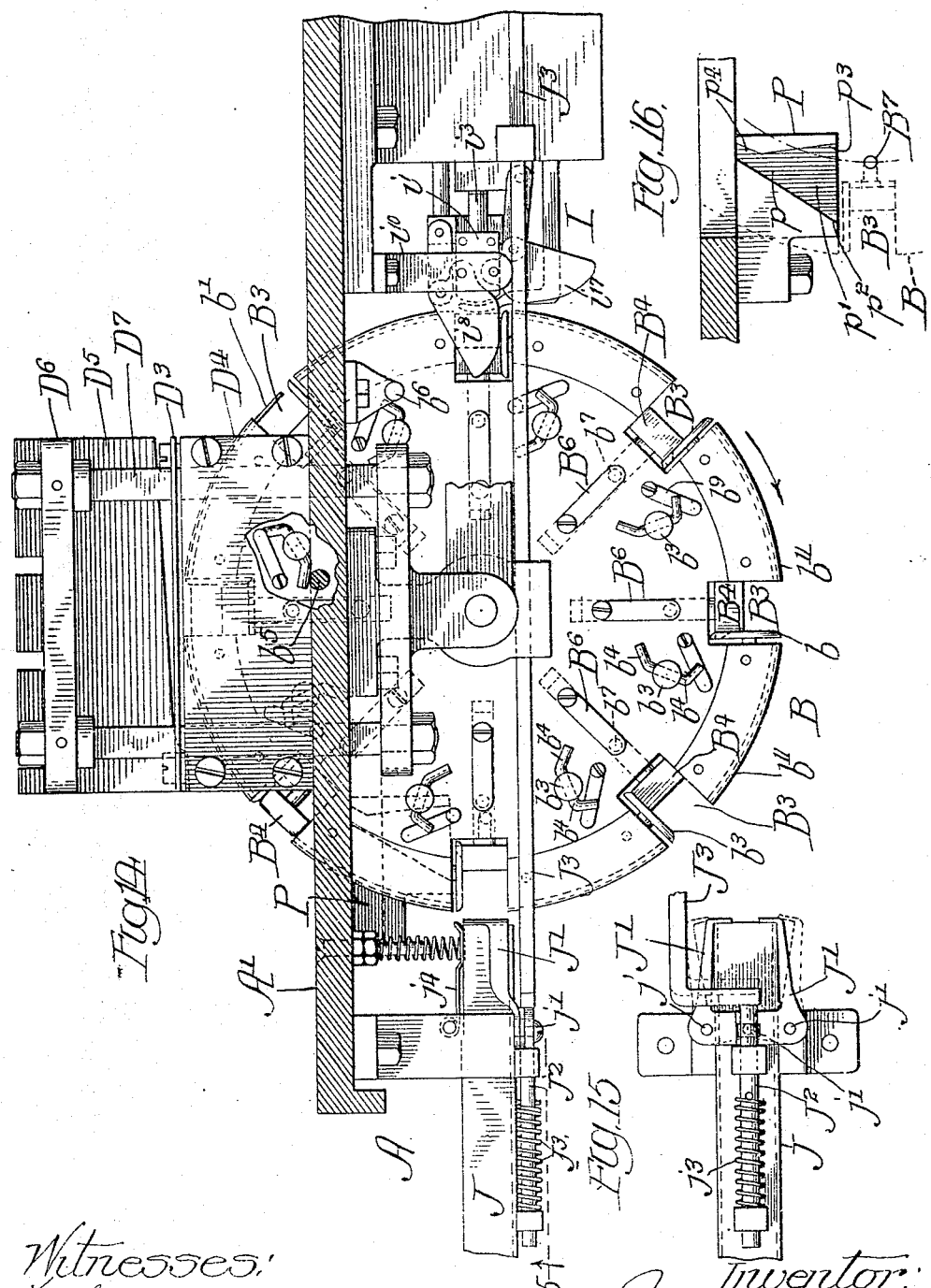

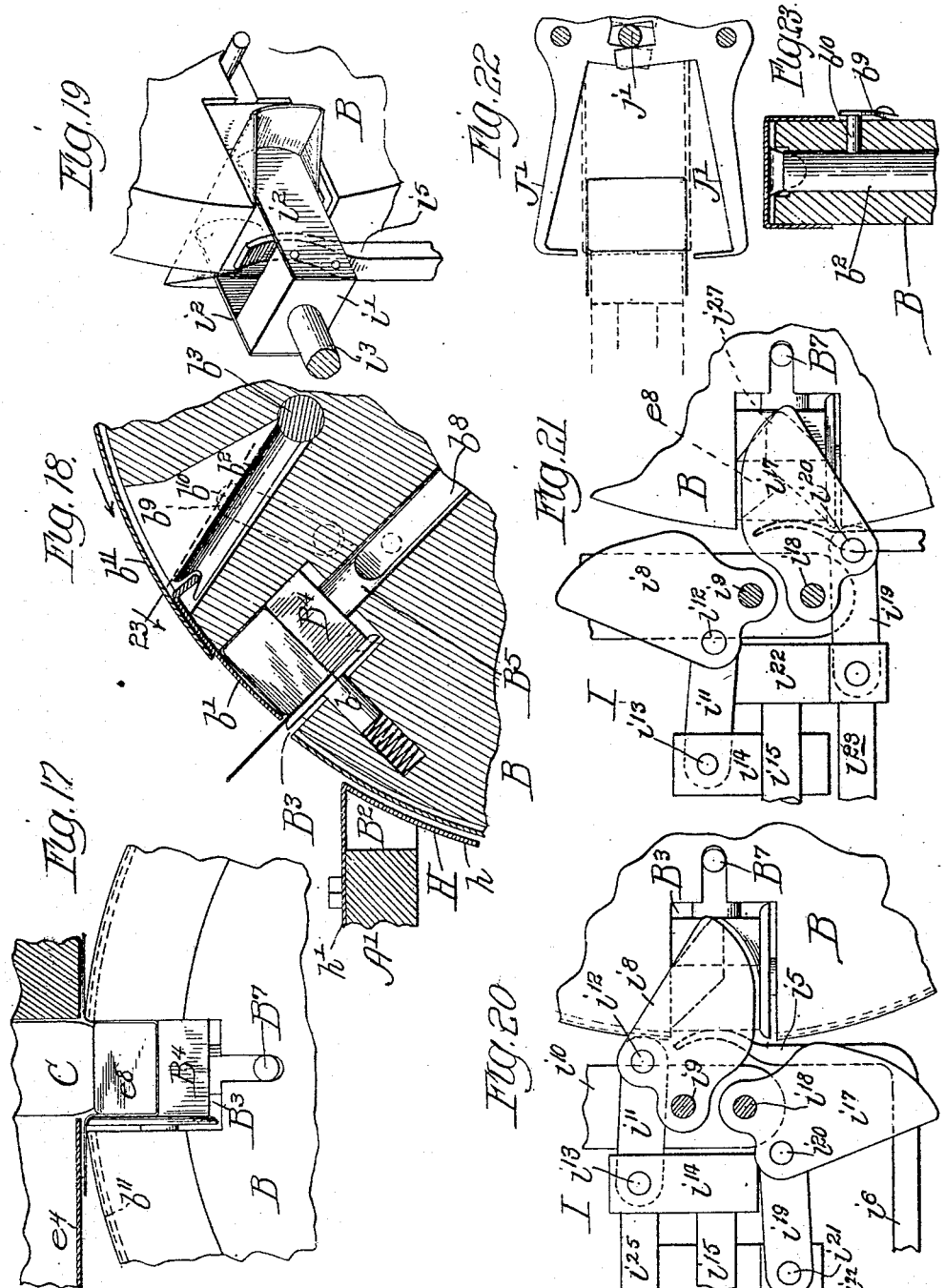

UNITED STATES PATENT OFFICE.

JOHN W. HICKS, OF CHICAGO, ILLINOIS, ASSIGNOR TO ORIENTAL CANDY COMPANY, OF CHICAGO, ILLINOIS, A CORPORATION OF ILLINOIS.

WRAPPING-MACHINE.

No. 879,544.     Specification of Letters Patent.     Patented Feb. 18, 1908.

Application filed October 6, 1906. Serial No. 337,833.

*To all whom it may concern:*

Be it known that I, JOHN W. HICKS, a citizen of the United States, residing at Chicago, in the county of Cook and State of Illinois, have invented a new and useful Improvement in Wrapping-Machines, of which the following is a specification.

My invention pertains particularly to wrapping machines of the type shown and described in patent to Hicks No. 719410, granted January 27, 1903.

My primary object is to provide, in combination with mechanism of the general character shown in said patent, improved means for feeding the stock to and delivering it from the machine, as well as to provide certain improvements in details of construction adapted to improve the operation of the machine generally.

The machine is particularly adapted for cutting caramels from a strip and wrapping the caramels, but the machine may be put to other uses.

My invention is illustrated in its preferred embodiment in the accompanying drawings, in which—

Figure 1:
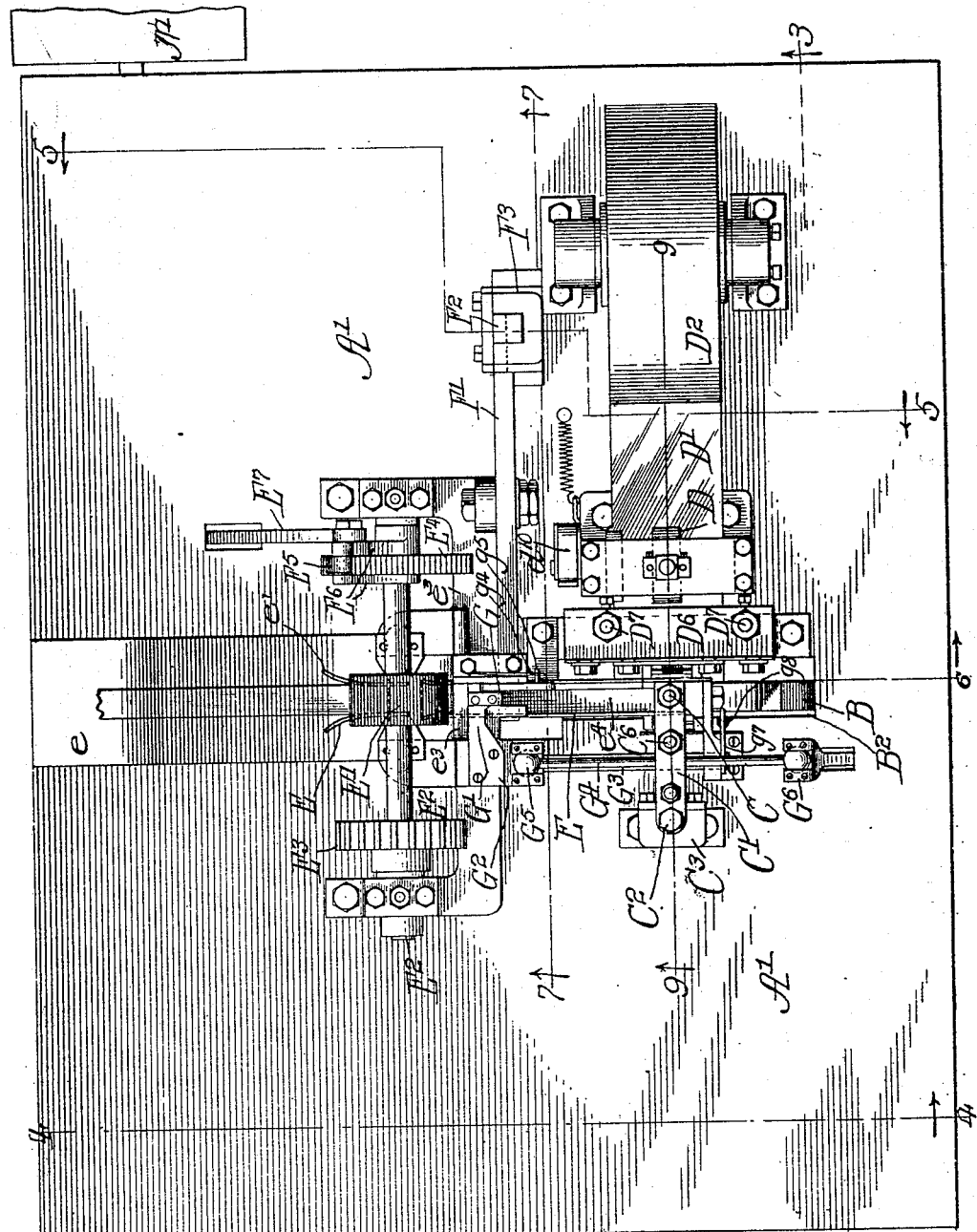
Figure 2:
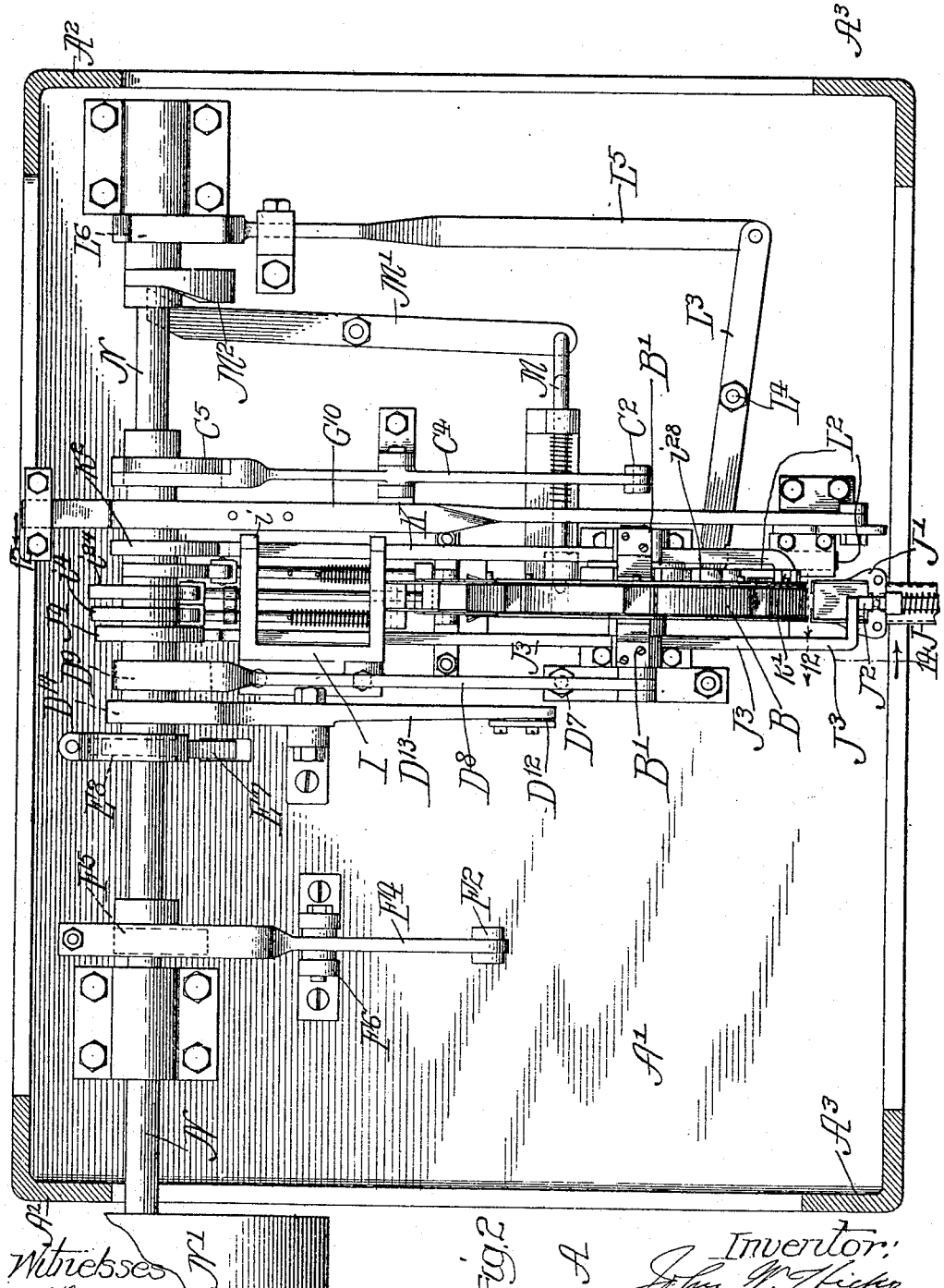

Figure 1 is a plan view of a wrapping machine embodying my improvements; Fig. 2, a section taken as indicated at line 2 of Fig. 3; Fig. 3, a section taken as indicated at line 3 of Fig. 1; Fig. 4, a section on line 4 of Fig. 1; Fig. 5, a vertical section taken as indicated at line 5 of Fig. 1; Fig. 6, a vertical section taken as indicated at line 6 of Fig. 1; Fig. 7, an enlarged broken transverse section taken as indicated at line 7 of Fig. 1, showing the mechanism for feeding the caramel strip and cutting it into caramels; Fig. 8, a plan view of the mechanism shown in Fig. 7, the view being taken, as indicated at line 8 of Fig. 7; Fig. 9, a broken transverse sectional view taken as indicated at line 9 of Figs. 1 and 5; Fig. 10 a broken sectional view of a portion of the feed chute for the caramels, the section being taken as indicated at line 10 of Fig. 11; Fig. 11, a plan view of said chute, the view being taken as indicated at line 11 of Fig. 9; Fig. 12, a broken vertical section taken as indicated at line 12 of Fig. 2 and showing the stock-wheel, or caramel carrier, in section and folder mechanism for effecting three end-tucks of the wrapper in elevation; Fig. 13, a plan section taken as indicated at line 13 in Fig. 12; Fig. 13$^a$, a vertical section taken as indicated at line 13$^a$ of Fig. 12; Fig. 14, a broken section taken as indicated at line 14 of Fig. 2 and showing the relation of the discharge chute of the machine to the rotary carrier; Fig. 15, a broken bottom view taken as indicated at line 15 of Fig. 14 and showing the mechanism for effecting the final end-tucks of the wrapper; Fig. 16, a broken sectional view parallel to the section shown in Fig. 4, but looking in the opposite direction, and illustrating more fully the cam shown at the right-hand portion of Fig. 4 which serves to properly position the caramel ejectors employed in connection with the rotary carrier; Fig. 17, a broken sectional view illustrating the relation of the plunger which serves to depress the caramels into the peripheral receptacles of the carrier with relation to the carrier and illustrating further the manner in which the first two folds of the paper are effected; Fig. 18, a broken sectional view illustrating the manner in which the third fold of the paper is effected, as well as the means for effecting the fourth fold of the paper; Fig. 19, a broken perspective view illustrating the manner in which the first end-tuck of the wrapper is effected; Fig. 20, a broken side elevational view illustrating the manner in which the second end-tuck of the wrapper is effected; Fig. 21, a broken side elevational view illustrating the manner in which the third end-tuck of the wrapper is effected; Fig. 22, a sectional view parallel to the view shown in Fig. 15, and illustrating the manner in which the final end-tucks of the wrapper are effected; and Fig. 23, a broken section taken as indicated at line 23 of Fig. 18 and illustrating the manner in which the rock-arms employed in connection with the carrier for operating the peripheral folder-plates are yieldingly locked in different positions.

It may be preliminarily stated that the construction shown involves an intermittently actuated rotary stock-wheel, or carrier, provided peripherally with receptacles for the caramels; frictionally-held ejector-plates movable radially in said receptacles upon which, in proper sequence, the severed wrapping paper rests preparatory to having deposited thereon the caramel to be wrapped; means for feeding a caramel strip into the machine, sizing the strip, severing a caramel therefrom and then depositing the caramel upon the wrapping paper over the uppermost receptacle of the rotary carrier; a vertically reciprocating plunger serving to depress the caramel into the uppermost receptacle, thereby making two folds of the wrapper, said plunger having means for depressing the ejector-plate to prevent undue pressure upon the caramel; means for turning the stock-wheel step by step and locking it in its position of rest; a peripheral folder-plate corresponding with each receptacle and serving to make the first top-fold of the wrapper; a stationary folder-plate adjacent to the periphery of the carrier serving to make the second top-fold of the wrapper; whereby the wrapping of the caramel on four sides is completed and the ends of the wrapper left projecting laterally from the wheel; a local group of folders located adjacent to the periphery of the wheel and serving to effect three end-tucks of the wrapper; a discharge chute for receiving the wrapped caramels equipped with means for actuating the final folds of the wrapper; means for effecting the final folds of the wrappers; means for actuating the ejectors as they reach, in succession, the discharge-chute; and means for restoring the ejectors to a position substantially flush with the periphery of the wheel before the ejectors pass again into position beneath the plunger which serves to eject the caramels into the receptacles.

Many of the features of construction herein shown are fully illustrated and claimed in the above-mentioned patent, and will be referred to herein only sufficiently to enable the present improvements to be fully understood.

In the preferred construction, A represents the frame of the machine, comprising a table, or top, $A^1$ and pairs of legs $A^2$, $A^3$ connected with the corner portions of the table; B, an intermittently actuated rotary stock-wheel, or carrier, of well-known construction, journaled in brackets $B^1$ on the lower side of the rear portion of the table, the upper portion of the wheel projecting above the table through a slot $B^2$; $B^3$, peripheral receptacles with which the wheel B is provided, and which are equipped with paper-supporting ejector blocks $B^4$ having radial stems $B^5$, which are frictionally engaged, as shown in Fig. 9, by studs carried by springs $B^6$ attached to one lateral surface of the wheel, said stems being provided with laterally projecting studs $B^7$ adapted to be engaged by mechanism for actuating the ejectors when the discharge-chute is reached, the studs on said stems serving also as a means whereby the ejectors may be positively depressed to prevent undue deformation of the caramel at the time of its injection into the receptacle; C, a vertically reciprocating plunger serving to depress the caramels into the receptacles, as they are in turn presented beneath it, said plunger being carried by a bar $C^1$ mounted on the upper end of a vertically reciprocating slide $C^2$ movable in a guide $C^3$ and actuated by a lever $C^4$ and a cam $C^5$ in a well-understood manner; $C^6$ (Fig. 9), a member carried by the cross-head $C^1$ of the plunger C and serving to positively depress the ejectors $B^4$ after the caramels have been deposited thereon by the plunger; $C^7$, a pair of spring-held separable jaws serving to hold the caramel in position for the latter to be engaged by the plunger C, the plunger C serving to separate the jaws to allow the caramel to be depressed into the receptacle of the wheel, in a well understood manner; D (Figs. 1, 5 and 9), a pair of feed-rolls serving to deliver wrapping paper $D^1$ from a roll $D^2$ through a guide $D^3$ and between a stationary knife $D^4$ and a vertically reciprocating knife $D^5$, said knife $D^5$ being connected with a cross-head $D^6$ carried by plungers $D^7$ operated by a lever $D^8$ (Fig. 2) and a cam $D^9$, in a well understood manner; $D^{10}$ (Fig. 9), a pawl operating upon a ratchet-wheel $D^{11}$ connected with the lowermost feed-roll D, said pawl being actuated by a strap $D^{12}$ operated by a lever $D^{13}$, which, in turn, is actuated by a cam $D^{14}$, as shown in Fig. 5; E, a feed-chute through which a caramel-strip is fed into the machine and the caramels severed therefrom delivered beneath the plunger C; $E^1$, a pair of feed and sizing rolls for the caramel strip mounted on transverse shafts $E^2$ connected by gears $E^3$; $E^4$, a ratchet-wheel connected with the uppermost one of the shafts $E^2$ and actuated through the medium of a pawl $E^5$ carried by an arm $E^6$ actuated by an eccentric-rod $E^7$ and an eccentric $E^8$; F, a caramel knife carried by a lever $F^1$ actuated by a vertically reciprocating slide $F^2$ movable in a housing $F^3$ and actuated by a lever $F^4$ operated by a cam $F^5$, the lever $F^4$ being pivotally supported on a bracket $F^6$ depending from the lower side of the table $A^1$; G, a caramel feed finger or blade (Fig. 6) carried by an arm $G^1$ projecting laterally from a slide $G^2$ (Figs. 7 and 8) which is splined upon a shaft $G^3$ and movable longitudinally thereof, as shown in Fig. 7; $G^4$, a connecting rod having universal connection $G^5$ (Fig. 1) with the slide $G^2$ and having universal connection $G^6$ (Figs. 1 and 4) with a substantially vertical lever $G^7$ supported on a pivot $G^8$ carried by a bracket $G^9$ depending from the underside of the table; $G^{10}$, a connecting rod joining the lower end of the lever $G^7$ and a cam $G^{11}$ which serves to operate the caramel-feed finger through the connections described; H, a stationary folder-plate which serves to effect the second or last top-fold of the wrapper as the caramel is carried beneath the folder-plate after the operation of the peripheral folder-plate which effects the first top-fold of the wrapper; I, folding mechanism located adjacent to the front edge of the rotary carrier comprising a group of local folders for effecting the outer end-tucks, the rear end-tucks, and the advance end-tucks; J, a discharge chute located at the rear edge of the carrier-wheel and serving to receive the wrapped caramels; $J^1$ (Figs. 14, 15 and 22), a pair of jaws connected with said discharge-chute and serving to effect the final end-tucks of the wrapper; $J^2$, a plunger serving to actuate the final folders; $J^3$, a slide serving to actuate the plunger $J^2$ in one direction, said slide being movable in a guide with which one of the brackets $B^1$ is provided, as shown in Fig. 9, and actuated by a cam $J^4$, as shown in Fig. 2; K (Figs. 2 and 6) an ejector-actuating slide which moves in a guide with which one of brackets $B^1$ is provided, as shown in Figs. 6 and 9, said slide being actuated in one direction by a spring $K^1$ and in the other direction by a cam $K^2$; L, (Fig. 6), a ratchet-wheel serving to actuate the rotary carrier, said wheel being engaged by a pawl $L^2$ (Figs. 2 and 4) which, in turn, is operated by a horizontally disposed lever $L^3$ supported on a pivot $L^4$ and actuated by a connecting-rod $L^5$ operated by a cam $L^6$; M (Fig. 2), a wheel-locking plunger actuated by a lever $M^1$ controlled by a cam $M^2$, the plunger serving to engage a series of recesses $M^3$ in one of the lateral surfaces of the carrier-wheel, as shown in Fig. 6; N, a power-shaft upon which the various cams and eccentrics mentioned are mounted, said shaft being operated through the medium of a pulley $N^1$; and P (Figs. 4 and 16), a cam serving to position the ejector-blocks substantially flush with the periphery of the carrier-wheel as the receptacles pass in turn beneath the plunger which serves to depress the caramels into the receptacles.

The construction of the frame A is similar to the construction of the frame shown in the above-mentioned patent, and requires no detailed description.

The construction of the stock-wheel, or carrier-wheel, B, is well known in machines now in practical operation, and is described in detail in the above-mentioned patent. The peripheral receptacles $B^3$ are open at the sides and have equipment which is very similar to that described in the above-mentioned patent. The advance wall of each receptacle is equipped with a spring-held plate $b$, of well-known construction. At the rear of each receptacle (speaking with reference to the direction of rotation of the carrier) is a peripheral folder-plate $b^1$ actuated by a radially disposed rock-arm $b^2$ carried by a rock-shaft $b^3$, one end of which projects laterally from the wheel and is equipped with operating arms $b^4$ adapted to be engaged by stops $b^5$, $b^6$ carried by the frame of the machine, as illustrated in Figs. 5, 9 and 14. The springs $B^6$ heretofore mentioned are secured at their inner ends on a lateral surface of the carrier wheel and equipped at their outer ends with inturned studs $b^7$ which enter openings in the wheel and bear upon flattened surfaces $b^8$ with which the stems $B^5$ of the ejector-blocks are provided. As shown in Figs. 14, 18 and 23, the carrier-wheel is equipped on one lateral surface with a series of springs $b^9$ which are provided with inturned studs $b^{10}$ adapted to engage the rock-arms which actuate the peripheral folder-plates $b^1$. The springs yield to permit the studs to ride over the rock arms when the latter are actuated, so that the rock-arms will be yieldingly locked at either end of their traverses, as the case may be. The peripheral folder-plates $b^1$ move in guides $b^{11}$ which are formed by applying segmental curved sheet-metal members of U-shaped cross-section to the periphery of the wheel, thereby affording between the periphery of the wheel and the webs of said U-shaped members channels in which the peripheral plates may move. This will be clearly understood by reference to Figs. 6 and 18.

The plunger C is beveled somewhat near its lower end, the beveled surfaces serving to engage inwardly projecting beveled studs, or screws $c$, with which the jaws $C^7$ are provided, so that the plunger will serve on its downward stroke to separate the jaws and permit the caramel to drop upon the wrapper. This will be understood by reference to Figs. 9, 10 and 11. The member $C^6$ which serves to depress the ejector-blocks $B^4$ comprises, as shown in Fig. 9, a rod depending from the cross-head $C^1$ and having a laterally turned lower end adapted to engage the lateral studs with which the stems of the ejectors are equipped.

The paper-feeding rolls D are actuated in the same manner as shown in the above-mentioned patent. The upper roll D is mounted in a novel manner, however. As appears from Figs. 3, 5 and 9, the upper roll has a shaft $d$ which is journaled in vertically movable bearings $d^1$ mounted in guides $d^2$ and normally held depressed by springs $d^3$. The guides $d^2$ are joined at their tops by a bar $d^4$ upon which bears a cam $d^5$ equipped with a handle $d^6$. The cam $d^5$ is equipped with a pivot $d^7$ upon which are mounted blocks $d^8$ connected by members $d^9$ with the shaft $d$ of the upper feed-roll. When the cam $d^5$ is in the position shown in Fig. 9 the upper feed-roll is lifted slightly from the paper, and when the handle $d^6$ is thrown into the horizontal position, the roll under the action of its springs, is caused to bear upon the paper.

The feed-chute E, through which the stock is delivered to the carrier-wheel comprises a member $e$ having a horizontal portion resting upon the front portion of the table and an inclined portion leading to the space between the feeding and sizing rolls $E^1$; forwardly divergent guide-members $e^1$ which serve to size the caramel strip in width as the strip is drawn through the chute by the rollers $E^1$, which serve to size the strip in depth or thickness; a chute section $e^2$ in the rear of the rollers $E^1$, a portion of said chute-section being formed in a casting $e^3$ supported on the table; a chute section $e^4$ separated from the chute section $e^3$ by a vertical slot, or space $e^5$, as shown in Fig. 6; and a caramel stop $e^6$ at the rear end of the chute. The feed-rolls $E^1$ are slightly serrated, or grooved, peripherally, the serrations extending parallel with the axes of the rollers, thereby giving the effect of knurled surfaces adapted to more securely engage the caramel strip in the operation of drawing it into the machine. As indicated in Fig. 1, the feed-rolls are of greater width than the space between the lateral sizing members $e^1$. In Fig. 6, $e^7$ represents a caramel strip being fed into the machine, and $e^8$ represents a caramel which has been severed from the strip, the knife F having receded, and the feed-finger G having followed the knife in its recession, thus having entered between the caramel and the caramel strip in position ready to feed the caramel rearwardly to a position beneath the plunger C at the next movement of the slide $G^2$. The operation of the feed and sizing rollers $E^1$ will be understood without further detailed description, it being remarked that the arm $E^6$ oscillates as the shaft N rotates, thereby imparting, through the medium of the pawl and ratchet-wheel, intermittent feeding movement to the feed rolls, and hence to the caramel strip.

The caramel knife F, as appears from Figs. 6 and 7 is disposed transversely beneath the chute E and in the vertical plane of the slot $e^5$ of the chute. The lever $F^1$ which carries the knife is a substantially horizontal lever, and its manner of operation will be understood without further description. It is sufficient to say that the lever is intermittently actuated to sever the caramel from the strip after the feed-wheels $E^1$ have performed their function of feeding the caramel strip the required distance. It may be remarked that by reason of the slotting of the feed-chute E the caramel strip and the caramels severed therefrom are afforded a bearing upon the bottom of the chute close to the knife, so that the knife will be readily freed from the caramel strip and caramel, notwithstanding the tendency of the material to adhere to the knife. In addition, the knife is kept oiled by a suitable vegetable oil applied to a pad $f$ located in a chamber formed in the casting $e^3$, as shown in Fig. 6, the knife wiping against said pad during its operation.

The feed-finger G which serves to move the caramel rearwardly to a position beneath the plunger C comprises a down-turned blade carried by a horizontal shaft attached to the arm $G^1$ of the slide $G^2$. The arm $G^1$ is equipped, as shown in Fig. 8, with a projecting finger $g$ which, in the rearward movement of the slide $G^2$, moves under a cam $g^1$ connected by a pivot $g^2$ with a stationary member $g^3$ carried by the frame of the machine; and said finger $g$, in the return movement of the slide, rides upon the cam $g^1$, thereby to raise the feed-finger G high enough to carry it over a fresh caramel, which by this time has been severed from the strip. The cam $g^1$ is normally held depressed by a spring $g^4$ which bears upon a lateral stud $g^5$ with which the cam is provided near its free down-curved end, as shown clearly in Fig. 8. As the finger $g$ rides up over the cam on the return movement of the slide $G^2$, it turns or rocks the slide and its shaft $G^3$, as will be understood by reference to Fig. 7, the slide being splined freely upon the shaft by means of a key $g^6$. The rear end of the shaft $G^3$ is provided with an arm $g^7$ which is connected with a spring $g^8$ connected with a stationary part $g^9$ applied to the frame of the machine, as shown in Figs 1 and 3. It will be understood that the spring tends to return the rock-shaft to its original position when the finger $g$ returns to a position to permit it to drop over the rear end of the cam $g^1$ onto the surface $g^{10}$ which constitutes the upper end of the casting $e^3$. Thus, the feed-finger G is forcibly entered between the caramel and the caramel-strip as the severing knife recedes after the severing operation.

As clearly shown in Fig. 18, the member H which serves to make the second top-fold of the wrapper comprises a segmental spring metal member $h$ located in the slot $B^2$ of the table at the rear edge of the wheel and having a rearwardly extending horizontal shank $h^1$ secured to the table.

Referring more particularly to Figs. 12, 13, 13$^a$, 14, 19, 20 and 21, the local folding mechanism I which serves to make three of the end-tucks of the wrapper, comprises a hanger $i$ depending from the under surface of the table; a radially movable bifurcated member $i^1$ having blades $i^2$ and a stem $i^3$ actuated by a cam $i^4$ on the shaft N, the blades $i^2$ serving to effect the top, or outer, end-tucks of the wrapper, as shown in Fig. 19; a presser member $i^5$ disposed between the blades $i^2$ and adapted to bear upon the exposed surface of the wrapper over the caramel, said presser being carried by a shank $i^6$ actuated by a cam $i^7$ on the shaft N; a pair of blades $i^8$ connected by pivots $i^9$ with a hanger $i^{10}$; links $i^{11}$ connected by pivots $i^{12}$ with the blades $i^8$ and connected by pivots $i^{13}$ with the head $i^{14}$ having a stem $i^{15}$ actuated by a cam $i^{16}$, the blades $i^8$ serving to effect the second end-tucks of the wrapper; a pair of blades $i^{17}$ connected by pivots $i^{18}$ with the hangers $i^1$,$^0$ links $i^{19}$ connected by pivots $i^{20}$ with the blades $i^{17}$ and connected by a pivot $i^{21}$ with a head $i^{22}$ having a stem $i^{23}$ actuated by a cam $i^{24}$. The head $i^{14}$ is additionally equipped with a guide-rod $i^{25}$; and the head $i^{22}$ is additionally equipped with a guide-rod $i^{26}$. This will be understood by reference to Figs. 13 and 13$^a$. The parts are so timed that after the presser $i^5$ bears upon the wrapper and the inclosed caramel, the blades $i^2$ are actuated to effect the first end-tucks and thereafter the blades $i^{17}$ are actuated to effect the third end-tucks. Fig. 21 shows the condition after these operations have occurred, and in this condition the wrapper is left with triangular wings, or folds, $i^{27}$, projecting parallel with the lateral surfaces of the carrier wheel toward the center of the wheel. In this condition, the wings or folds $i^{27}$ are in position to pass between segmental guide-members $i^{28}$, whose front ends are shown in Fig. 13 to be somewhat divergent and which confine the projecting folds of the paper during the rotation of the wheel until the discharge-chute is reached.

The discharge-chute J comprises an open-topped narrow chute of sufficient dimensions to receive the caramels in the position in which they are ejected from the machine. The bell-crank members $J^1$ which serve to effect the final folds of the wrapper are supported at their angles on pivots $j$ and have inturned arms connected by a pivot $j^1$ with the plunger $J^2$. The plunger $J^2$ is actuated in one direction by a spring $j^3$, and it is operated in the other direction by the rod $J^3$. The rod $J^3$ serves to positively close the folders, and the spring $j^3$ serves to open the folders. Above the chute J adjacent to the carrier-wheel is a pivotally-supported spring-held presser member $j^4$ which bears upon the caramels as they are ejected from the wheel.

The ejector-actuating rod K is equipped (Fig. 6) at its rear end with a bifurcated head $k$ at whose base is a slot $k^1$ which enables the lateral studs $B^7$ on the stems of the ejectors to enter between the bifurcations of the head as the receptacles arrive in turn at the discharge chute. When a receptacle arrives at the discharge chute, the rod K is actuated to move the ejector outwardly radially, thereby causing the caramel to enter the chute J, pushing before it any caramels which may already have been deposited. As the rod K starts on its return movement, which it does immediately after the ejection of the caramel, the jaws $J^1$ close and the projecting wings $i^{27}$, one of which is clearly shown in Figs. 5 and 6, are bent inwardly over that surface of the wrapper which, during the previous operations, lay closest to the center of the carrier wheel. As the carrier continues its rotation, the stud $B^7$ passes from between the bifurcations of the head $k$ of the ejector-actuating rod K and thereafter enters the cam P which serves to move the ejector to a proper position to receive the wrapper when the receptacle passes again beneath the plunger C. The ratchet wheel L connected with the carrier, and the means serving to actuate the carrier through the medium of said ratchet wheel need not be described further in detail, inasmuch as mechanism of this character is well known and is fully disclosed in the above-mentioned patent. The wheel-locking plunger M and its attendant parts are well known, and are fully described in the above-mentioned patent. The cam P, which serves to properly position the ejector-blocks, after the ejectors have passed the discharge chute, is shown in elevation in Fig. 16. It comprises a block having a lateral slot $p$ with a downwardly flaring lower end $p^1$ presenting inclined surfaces $p^2$, $p^3$ adapted to engage the studs $B^7$ on the stems of the ejectors and guide said studs into the narrow portion $p^4$ of the slot, which narrow portion corresponds with the outward position of the ejectors.

From the foregoing detailed description, the operation of the machine will be readily understood. A caramel strip $e^7$ of somewhat larger dimensions than the feed-chute E is fed by an operator between the rolls $E^1$ by which it is drawn between the guide members $e^1$ and sized as to width, and at the same time it is sized as to depth or thickness by the rollers $E^1$. The feeding action of the rollers $E^1$ is intermittent, and during the period of inaction of said feeding rolls the knife F operates, by an upward stroke, to sever a caramel from the caramel strip. Thereupon, the caramel-feed finger G drops into the space between the caramel strip and the caramel severed therefrom, this action preferably occurring during the receding movement of the knife F. The spring $g^8$ acts with force, if necessary, to cause the finger G to enter the space between the caramel and the caramel strip. After this action occurs, the slide $G^2$ is moved rearwardly, during which movement the finger $g$ on the arm $G^1$ passes beneath the cam $g^1$, the latter rising to permit this movement. In the meantime, the paper-feeding rolls are intermittently actuated to feed the wrapping paper to a position above a receptacle of the carrier, which is at the proper moment brought beneath the plunger C, the carrier being locked in its position of rest while the plunger C operates to open the jaws $C^7$ and depress the caramel onto the wrapper. Before any objectionable deformation of the caramel occurs, the ejector-depressor $C^6$ operates to positively move the ejector inwardly to give room for the caramel to enter the receptacle of the carrier. As will be understood, a stroke of the slide $G^2$ is sufficient to deliver the caramel, after severance from the caramel strip, between the jaws $C^7$ and directly above the uppermost receptacle of the carrier. The operation of the plunger in depressing the caramel into a receptacle serves to effect the first two folds of the wrapper. Thereupon the carrier starts to rotate, and, the stud $b^5$ engaging the arm $b^4$ of the corresponding rock-shaft $b^3$, serves to actuate the peripheral folder-plate $b^1$ of the newly filled receptacle, thereby effecting the first top-fold of the wrapper. In the further movement of the carrier, the remaining top-fold of the wrapper is effected by engagement of the folder member H, the peripheral folder-plate being withdrawn as the wrapper passes beneath the folder H. In due course, the newly filled receptacle reaches the location of the local folding mechanism I, whereupon the member $i^1$ is operated to effect the first end-tucks of the wrapper, and this is followed immediately by the operation of the blades $i^8$ which effect the second end-tucks of the wrapper, after which the blades $i^{17}$ operate in quick succession to effect the third end-tucks of the wrapper. The receptacle then passes, at the next rotation of the wheel, between the guide members $i^{28}$ and is brought in due course, to the location of the discharge chute J, whereupon the ejector-actuating rod K is moved to eject the caramel from its receptacle into the discharge-chute, and during the return movement of the ejector the bell-crank members $J^1$ are actuated, through the medium of the rod $J^3$, to effect the final tucks of the wrapper. As the wrapped caramels are forced into the discharge-chute, they bear against each other snugly preventing the wrapper from unfolding. The discharge-chute may be of any suitable length, and ordinarily the caramels are removed therefrom in quantity by an attendant, who places them in boxes. It may be remarked that the ejector-blocks $B^4$ are thick enough to enable the wings $i^{27}$ of the wrappers to be neatly folded against their lateral surfaces.

The foregoing detailed description has been given for clearness of understanding only, and no undue limitation is to be understood therefrom.

What I regard as new, and desire to secure by Letters Patent, is—

1. The combination with mechanism for carrying and wrapping an article, of mechanism for feeding and preparatorily sizing a strip of material, a cutter in the rear of the feeding and sizing mechanism for severing the strip into articles to be wrapped, and a reciprocating feed-member serving to move the severed article rearwardly to the carrying and wrapping mechanism.

2. The combination with mechanism for carrying and wrapping an article, of means for feeding a strip of material into the machine, means for severing the strip into articles to be wrapped, a reciprocating member serving to move the article rearwardly after severance from the strip, and a plunger serving to deliver the article to the carrying and wrapping mechanism.

3. In a wrapping machine, the combination with mechanism for wrapping an article, of means for feeding a strip of material into the machine, a knife serving to sever the strip, a feed-finger opposed to said knife and adapted to move the article rearwardly after severance, and a plunger serving to deliver the articles to the wrapping mechanism.

4. In a wrapping machine, the combination of a carrier equipped with receptacles for receiving articles to be wrapped, means co-acting with said carrier for effecting folds of a wrapper, a feed-chute through which the articles to be wrapped pass to the carrier, means for feeding a strip of material into said feed-chute, a severing knife, and a reciprocating feed-finger adapted to move the articles rearwardly after severance from the strip and deliver them to a position above the carrier.

5. In a wrapping machine, the combination of a carrier equipped with receptacles for receiving the articles to be wrapped, means co-acting with said carrier for effecting folds of a wrapper, a feed-chute through which the articles to be wrapped pass to the carrier, means for feeding a strip of material into said feed-chute, a severing knife, a plunger serving to depress the articles from the plane of the feed-chute into the receptacles, as they pass in turn beneath the plunger, and a reciprocating feed-finger adapted to move the articles after severance through the feed-chute from the severing knife to said plunger.

6. In a wrapping machine, the combination of a carrier equipped with receptacles, means co-acting with said carrier for effecting folds of a wrapper, a feed-chute provided with a slot, a severing-knife disposed on one side of said feed-chute, a reciprocating feed-finger disposed on the opposite side of said feed-chute and adapted to enter said slot as the knife recedes therefrom, and means for feeding a strip of material through said feed-chute.

7. In a wrapping machine, the combination of a carrier, means co-acting with said carrier for effecting folds of a wrapper, a feed-chute provided with a slot, a knife disposed at one side of said feed-chute and adapted to work in said slot, a feed-finger disposed at the opposite side of said feed-chute and adapted to enter said chute at the plane of said slot, means for reciprocating said feed-finger longitudinally of the feed-chute, and means for lifting the feed-finger during its return movement to enable it to pass over the article to be fed.

8. In a wrapping machine, the combination of a carrier, means co-acting therewith for effecting folds of a wrapper, a feed-chute leading to the carrier, means for feeding a strip of material into the feed-chute, means for cutting said strip into articles to be wrapped, a slide equipped with a feed-finger, a guide extending longitudinally of the feed-chute upon which said slide is mounted, means for reciprocating said slide, and means for tilting said slide with reference to the axis of its guide during the return movement of the slide.

9. In a wrapping machine, the combination with a carrier and means co-acting therewith for effecting folds of the wrapper, of a feed-chute, means for feeding a strip of material into said feed-chute, a severing knife, a feed-finger opposed to said knife, a slide carrying said feed-finger, a rock-shaft upon which said slide is movable, a spring yieldingly holding said rock-shaft in a given position, means for reciprocating said slide, and a movable cam which serves to elevate said feed-finger during the return movement of said slide.

10. In a wrapping machine, the combination of a rotary carrier equipped with receptacles, a plunger adapted to depress the articles to be wrapped into said receptacles, a feed-chute through which articles are delivered to said plunger, means for feeding a strip of material into said feed-chute, a knife disposed at one side of said feed-chute and adapted to sever said strip into the articles to be wrapped, a feed-finger at the opposite side of said feed-chute and opposed to said knife, a slide carrying said feed-finger, means for reciprocating said slide longitudinally of the feed-chute, and a cam serving to lift the feed-finger during the return movement of reciprocation of said slide.

11. In a wrapping machine, the combination with mechanism for wrapping articles, of a feed-chute, curved guide members associated therewith serving to compress a strip of material on two sides thereof, a pair of feed-rolls serving to feed a strip of material between said members and to compress said strip on the two remaining sides thereof, a severing knife in the rear of said feed-rolls, and means for delivering the articles after severance to the wrapping mechanism.

12. In a wrapping machine, the combination of a rotary carrier equipped with peripheral receptacles, a feed-chute, a plunger for delivering articles from said feed-chute to said peripheral receptacles, a severing knife, means for transferring articles from the plane of the severing knife to said plunger, and means for feeding a strip of material to the severing knife and sizing the strip of material during its passage to said knife.

13. In a wrapping machine, the combination of a rotary carrier equipped with peripheral receptacles, means co-acting with said carrier for effecting the folds of a wrapper, a feed-chute, a plunger serving to deliver articles from the feed-chute to said receptacles, means for feeding a strip of material into the feed-chute, a severing knife, a slide equipped with a feed-finger, a rock-shaft on which said slide is mounted, a pivoted cam, a projection carried by said slide adapted to move under said cam in one direction of reciprocation of the slide and to move over said cam in the opposite direction of reciprocation of said slide, and means for reciprocating said slide longitudinally of the feed-chute.

14. In a wrapping machine, the combination with a rotary carrier equipped with peripheral receptacles and a plunger for depressing articles into said receptacles, of a feed-chute through which articles are delivered to the plunger, means for feeding a strip of material into said feed-chute, a severing knife disposed at one side of the feed-chute, a feed-finger disposed at the other side of the feed-chute, a slide carrying said feed-finger, a spring-held rock-shaft upon which said slide is mounted, a connecting rod having universal connection with said slide and an actuating lever having universal connection with said connecting rod.

15. In a wrapping machine, the combination of a frame having a table-top, a rotary carrier supported on said frame and projecting through a slot in the table-top, a vertically movable plunger disposed above said rotary carrier, a horizontally disposed feed-chute located in a plane above said carrier and provided with a slot, a severing knife normally located between the table-top and said feed-chute and adapted to work in said second-named slot, a pair of feed-rolls located one above and the other beneath the plane of said feed-chute, and a reciprocating feed-finger located above the plane of said feed-chute and opposed to said knife.

16. In a wrapping machine, the combination of a rotary carrier, means co-acting with said carrier for effecting folds of a wrapper, a substantially horizontal feed-chute located in a plane above said carrier, a severing knife, a pair of feed-rolls located one above and the other beneath said feed-chute and having axes parallel with the axis of said rotary carrier, and ratchet mechanism for intermittently actuating said feed-rolls.

17. In a wrapping machine, the combination of a rotary carrier having a horizontal axis, a substantially horizontal feed-chute located in a plane above said rotary carrier, a plunger for depressing articles from the feed-chute into the receptacles of the carrier, a severing knife, means for delivering articles from the plane of the severing knife to said plunger, a pair of feed rolls located in advance of the severing knife and disposed one above and the other beneath said feed-chute, with axes parallel to the axis of said rotary carrier, and a pair of stationary guiding and sizing members located at opposite sides of the path of the material and in close juxtaposition to said feed-rolls.

18. In a wrapping machine, the combination of a carrier equipped with receptacles, ejectors arranged in said receptacles, means co-acting with the carrier for effecting folds of a wrapper, a plunger serving to inject articles into the receptacles as they are brought in turn beneath it, and means for positively retracting the ejectors during the movement of injection of an article by the plunger.

19. In a wrapping machine, the combination of a carrier equipped with receptacles, ejectors arranged in said receptacles, means co-acting with the carrier for effecting folds of a wrapper, a plunger serving to inject articles into the receptacles as they are brought in turn beneath it, lateral projections on the stems of the ejectors, and a member movable with said plunger serving to engage said lateral projections and positively depress the ejectors, thereby preventing deformation of the article to be wrapped.

20. In a wrapping machine, the combination of a rotary carrier equipped with peripheral receptacles, ejector-blocks mounted in said receptacles, means for delivering wrappers to a point adjacent to the periphery of the carrier, a plunger serving to inject articles into the receptacles, thereby effecting two folds of the wrapper, means for effecting the two top folds of the wrapper, radially moving blades for effecting the first end-tucks of the wrapper, two pairs of pivoted blades serving to effect the second and third end-tucks of the wrapper, said pivoted blades being of sufficient length to overlap the ejector-blocks during the folding operation, thereby causing wings of the wrappers to lie adjacent to the lateral surfaces of the ejector-blocks, and means for effecting the final folds of the wrappers.

21. In a wrapping machine, the combination of a rotary carrier equipped with peripheral receptacles, ejectors mounted in said receptacles and equipped with stems provided with lateral projections, means for frictionally holding said stems, a plunger serving to depress articles into the receptacles, a member moving with said plunger and serving positively to depress said ejectors through the medium of said lateral projections, and means co-acting with the carrier for effecting folds of a wrapper.

22. In a wrapping machine, the combination of a rotary carrier equipped with peripheral receptacles, ejectors mounted in said receptacles, a plunger for delivering articles to said receptacles and effecting two folds of a wrapper, means for effecting the two top folds of the wrapper, and a local group of folders for effecting end-tucks of the wrapper comprising a pair of radially movable blades for effecting the first end-tucks, a pair of blades supported on stationary pivots for effecting the second end-tucks, an actuating stem linked to said second-named pair of blades, a pair of blades for effecting the third end-tucks which are supported on a stationary pivot, and an actuating stem linked to said third-named pair of blades, for the purpose set forth.

23. In a wrapping machine, the combination of a rotary carrier equipped with peripheral receptacles, means for depressing the articles to be wrapped into said receptacles, means for effecting all but the final folds of the wrapper, and final folding means comprising a pair of jaws, a spring-held plunger connected with said jaws, and a cam-actuated rod serving to move said plunger in one direction.

24. In a wrapping machine, the combination of a rotary carrier, a feed-chute disposed in a plane above said carrier, a plunger for delivering articles from the feed-chute to the receptacles of the carrier, a local group of folders disposed at the front edge of the carrier, a discharge-chute disposed at the rear edge of the carrier opposite said local group of folders, a pair of jaws for effecting the final folds of the wrapper pivotally connected with said discharge-chute, a spring-held plunger pivotally connected with the actuating arms of said jaws, and a cam-actuated rod serving to move said plunger in one direction.

25. In a wrapping machine, the combination of a rotary carrier provided with peripheral receptacles, ejectors mounted in said receptacles, means for delivering articles to said receptacles, lateral projections on said ejectors, means for effecting the desired folds of the wrappers, and an ejector-actuating rod adapted to engage the lateral projections of the ejectors when the receptacles are brought to the point of discharge.

26. In a wrapping machine, the combination of a rotary carrier provided with peripheral receptacles, ejectors mounted in said receptacles, means for delivering articles to said receptacles, lateral projections on said ejectors, means for effecting the desired folds of the wrappers, and an ejector-actuating rod equipped with a bifurcated head adapted to receive the lateral projections of the ejectors when the receptacles reach the point of discharge.

27. In a wrapping machine, the combination of a rotary carrier provided with peripheral receptacles, ejectors mounted in said receptacles, means for delivering articles to said receptacles, lateral projections on said ejectors, means for effecting the desired folds of the wrappers, a discharge-chute, and an ejector-actuating rod equipped near the front end of the discharge-chute with means for engaging the lateral projections of the ejectors as they are in turn presented thereat.

28. In a wrapping machine, the combination of a rotary carrier provided with peripheral receptacles, means for delivering articles to said receptacles, ejectors in said receptacles, lateral projections on said ejectors, means for effecting the desired folds of the wrappers, a discharge-chute, a pair of final folders located thereat, means for actuating said final folders, and an ejector-actuating rod equipped adjacent to the front end of the discharge chute with means for engaging said lateral projections of the ejectors as they are in turn presented thereat.

29. In a wrapping machine, the combination of a rotary carrier equipped with peripheral receptacles, ejectors mounted in said receptacles and equipped with lateral projections, a plunger for delivering articles to the receptacles, means for actuating the ejectors when the receptacles reach the point of discharge, means for frictionally holding the ejectors in any given position, and a cam adapted to return the ejectors to their outer positions as they pass from the point of discharge to the location of the plunger.

30. In a wrapping machine, the combination of a rotary carrier equipped with peripheral receptacles, ejectors mounted in said receptacles and equipped with lateral projections, a plunger serving to depress articles into said receptacles, means moving the plunger adapted to engage said lateral projections and positively depress the ejectors, a discharge-chute, means for actuating the ejectors when the receptacles reach the discharge-chute, and a cam located between the discharge-chute and the point of location of the plunger adapted to engage the lateral projections of the ejectors and positively move the ejectors toward the outer ends of their traverses as the receptacles pass to the plunger.

31. In a wrapping machine, the combination of a rotary carrier equipped with peripheral receptacles, ejectors in said receptacles with lateral projections, an ejector-actuating rod adapted to engage said lateral projections, a discharge-chute, and a pair of final folders located at the discharge-chute and adapted to effect the final folds of the wrapper after the ejection of the article and during the movement of retraction of the ejector.

32. In a wrapping machine, the combination of a rotary carrier equipped with peripheral receptacles, ejectors in said receptacles equipped with lateral projections, a plunger serving to deliver articles into the receptacles, a discharge-chute, a pair of final folders located at the front end of the discharge-chute, means for actuating said final folders, an ejector-actuating rod provided with means located adjacent to the front end of the discharge-chute for engaging the lateral projections of the ejectors, means for reciprocating said ejector-actuating rod, and an ejector-controlling cam located between the discharge-chute and the point of location of the plunger, for the purpose set forth.

33. In a wrapping machine, the combination with a rotary carrier equipped with peripheral folder-plates, of bell-crank levers serving to actuate said peripheral folder-plates, and means for yieldingly locking said bell-crank levers, for the purpose set forth.

34. In a wrapping machine, the combination of a rotary carrier equipped with peripheral receptacles, ejector-blocks in said receptacles, means for depressing articles into the receptacles thereby effecting two folds of the wrapper, means for effecting the two outer folds of the wrapper, a discharge-chute, a local group of folders located opposite the discharge-chute and serving to effect three end-tucks at each end of the wrapper and fold a wing of the wrapper over each lateral face of the ejector-block, guides extending from the point of location of said local group of folders to the front end of the discharge-chute, and a pair of final folders located at the front end of the discharge-chute, for the purpose set forth.

JOHN W. HICKS.

In presence of—
L. HEISLAR,
C. W. WASHBURNE.